US012409534B2

(12) United States Patent
Sugawara

(10) Patent No.: US 12,409,534 B2
(45) Date of Patent: Sep. 9, 2025

(54) FASTENING TOOL AND METHOD OF PRODUCING FASTENED PRODUCT

(71) Applicant: SUBARU CORPORATION, Tokyo (JP)

(72) Inventor: Hiroyuki Sugawara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/604,737

(22) Filed: Mar. 14, 2024

(65) Prior Publication Data

US 2024/0308038 A1 Sep. 19, 2024

(30) Foreign Application Priority Data

Mar. 15, 2023 (JP) ................................ 2023-041445

(51) Int. Cl.
*B25B 23/14* (2006.01)
*B25B 21/00* (2006.01)

(52) U.S. Cl.
CPC ........ *B25B 23/1415* (2013.01); *B25B 21/002* (2013.01); *B25B 21/004* (2013.01)

(58) Field of Classification Search
CPC ... B25B 21/002; B25B 21/004; B25B 21/005; B25B 21/007; B25B 21/02; B25B 23/00; B25B 23/0057; B25B 23/0064; B25B 23/0071; B25B 23/02; B25B 23/1415; B25B 23/145; B23P 19/00; B23P 19/06
See application file for complete search history.

(56) References Cited

U.S. PATENT DOCUMENTS 4,063,475 A * 12/1977 Perkins .................. B25B 17/00 81/57.3
4,538,483 A 9/1985 Batten
4,593,583 A * 6/1986 Singleton ............ B25B 23/1415 81/55

(Continued)

FOREIGN PATENT DOCUMENTS

EP 2243597 A1 * 10/2010 ............. B25B 13/06
EP 3 194 092 B1 4/2022

(Continued)

OTHER PUBLICATIONS

Extended European Search Report issued on Jul. 25, 2024 in European Patent Application No. 24160134.3, 5 pages.

*Primary Examiner* — Robert J Scruggs
(74) *Attorney, Agent, or Firm* — Finnegan, Henderson, Farabow, Garrett & Dunner, LLP

(57) ABSTRACT

A fastening tool for fastening a nut to a bolt includes a pipe and a coupling member. The nut breaks at specified torque. The pipe has a socket wrench, a detachable structure and a suction port. The detachable structure is for attaching to and detaching from a rotor of a rotational drive device. The suction port is for suctioning a piece of the nut broken by the specified torque. The coupling member has a flow path, a first coupling portion and a second coupling portion. The flow path is for suctioning the piece of the nut from the suction port. The piece of the nut is suctioned from the suction port with an ejector. The first coupling portion couples the coupling member to a casing of the rotational drive device. The second coupling portion couples the coupling member to a duct of the ejector.

20 Claims, 8 Drawing Sheets

(56) References Cited

U.S. PATENT DOCUMENTS

| | | | |
|---|---|---|---|
| 5,305,666 A | 4/1994 | LaTorre | |
| 5,343,784 A | 9/1994 | Neuhaus | |
| 8,479,613 B2 | 7/2013 | Saito et al. | |
| 8,627,750 B2 * | 1/2014 | Ortiz | B25B 23/1415 81/180.1 |
| 8,671,803 B2 * | 3/2014 | Katsunuma | B25B 21/02 81/55 |
| 11,110,556 B2 | 9/2021 | Hinrichs et al. | |
| 2021/0114186 A1 | 4/2021 | Batt | |

FOREIGN PATENT DOCUMENTS

| | | |
|---|---|---|
| JP | H06-155319 A | 6/1994 |
| JP | 2011-230244 A | 11/2011 |

* cited by examiner

FASTENING TOOL AND METHOD OF PRODUCING FASTENED PRODUCT

CROSS REFERENCES TO RELATED APPLICATIONS

This application is based upon and claims the benefit of priority from Japanese Patent Application No. 2023-041445, filed on Mar. 15, 2023, the entire contents of which are incorporated herein by reference.

BACKGROUND OF THE INVENTION

Field of the Invention

The present invention relates to a fastening tool and a method of producing a fastened product.

Description of Background Art

U.S. Pat. Nos. 4,538,483, 5,305,666, Japanese Patent Application Publication JP H06-155319A and Japanese Patent Application Publication JP2011-230244A describes a special fastening tool for fastening the HI-LOK fasteners. The entire contents of these publications are incorporated herein by reference.

SUMMARY OF THE INVENTION

According to one aspect of the present invention, a fastening tool for fastening a nut to a bolt by rotating the nut includes a pipe having a socket wrench, a detachable structure and a suction port, and a coupler having a flow path, a first coupling portion and a second coupling portion. The socket wrench is formed at one end portion of the pipe and inserts and rotates the nut, the detachable structure has at least one of a thread, a detachable coupler and a column, is formed at the other end portion of the pipe, and attaches to and detaches from a rotor of a rotational drive device having the rotor, a motor rotates the rotor, and a casing housing the rotor and the motor, the suction port is formed on a side of the pipe and suctions a piece of a nut broken by a specified torque, the flow path suctions the piece of the nut from the suction port of the pipe rotating with torque generated by the rotational drive device with an ejector, the first coupling portion couples the coupler to the casing of the rotational drive device, and the second coupling portion couples the coupler to a duct of the ejector.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
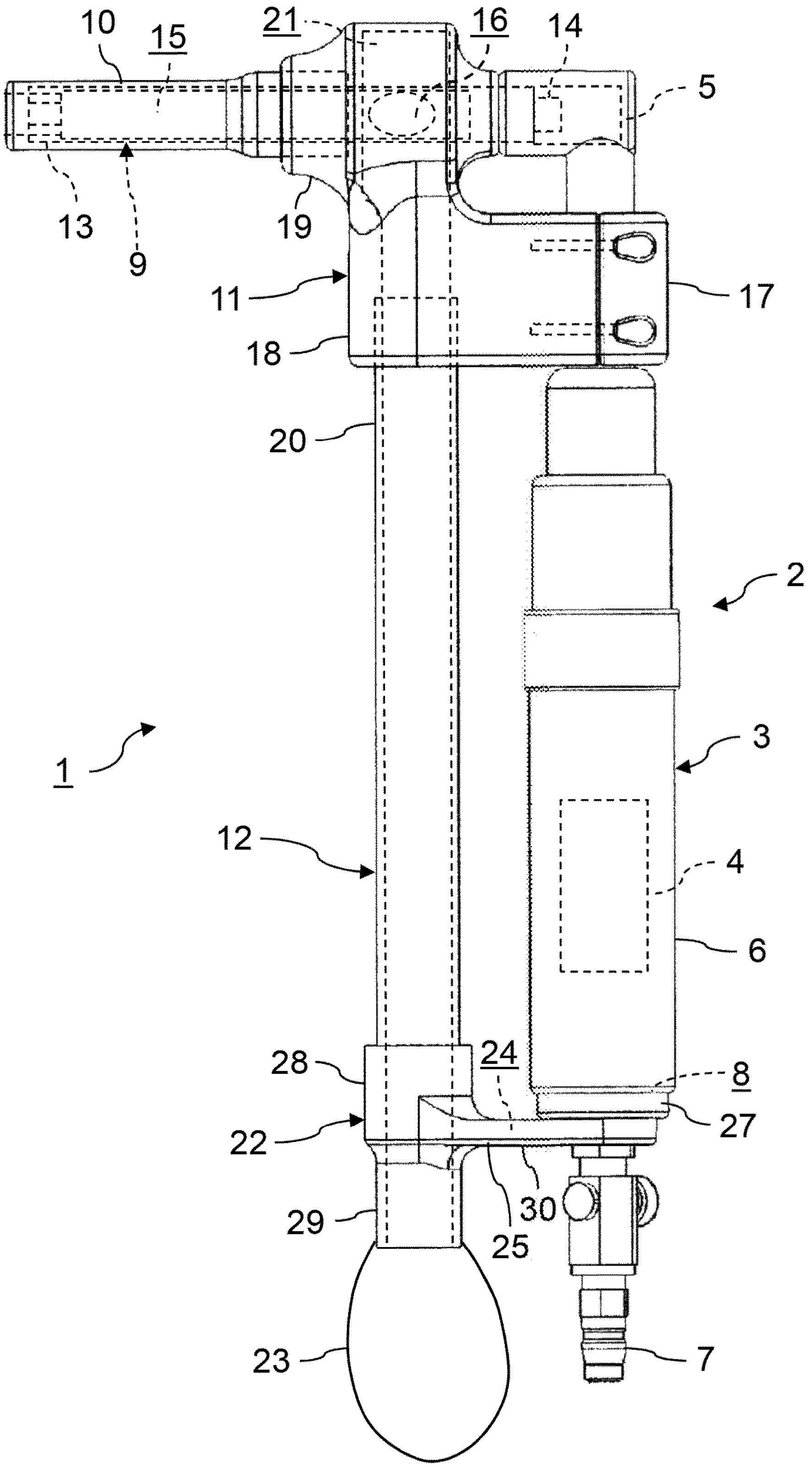
FIG. 1 is a front view showing structure of a fastening tool according to an embodiment of the present invention.

Embodiments will now be described with reference to the accompanying drawings, wherein like reference numerals designate corresponding or identical elements throughout the various drawings.

A fastening tool and a method of producing a fastened product according to embodiments of the present invention will be described with reference to accompanying drawings.

FIG. 1 is a front view showing structure of a fastening tool 1 according to an embodiment of the present invention.

The fastening tool 1 is a tool for fastening a fastener whose nut breaks when specified torque is applied. The fastening tool 1 has a function not only to rotate a nut but also to collect a piece of a broken nut.

Although a typical fastener whose nut breaks when specified torque is applied is a HI-LOK fastener, examples of a fastener whose nut breaks when specified torque is applied include a fastener having another name, such as a HI-LITE (registered trademark) fastener which is a development of a HI-LOK fastener. Hereinafter, an example case where a fastener whose nut breaks when specified torque is applied is a HI-LOK fastener will be described.

Figure 2:
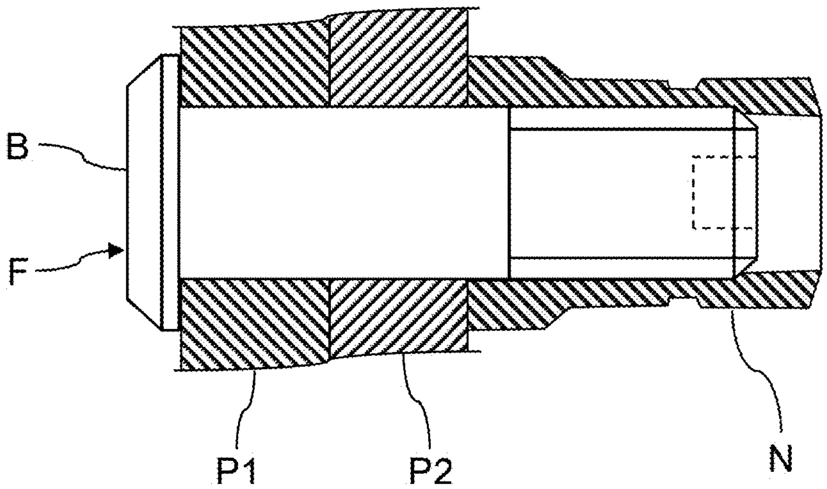
FIG. 2 shows an example in which two plate-shaped parts are coupled to each other by a HI-LOK fastener to be fastened by the fastening tool shown in FIG. 1.

FIG. 2 shows an example in which two plate-shaped parts P1 and P2 are coupled to each other by a HI-LOK fastener F to be fastened by the fastening tool 1 shown in FIG. 1.

The HI-LOK fastener F is composed of a bar-shaped bolt B and a tubular nut N. In many cases, a material of the bolt B and nut N is steel or titanium alloy. The bolt B has a head at the rear end, and an external thread for fastening the nut N on the outer surface of a distal end portion. Further, a hexagonal hole for inserting a hexagonal bar wrench is formed in the end face of the bolt B on the distal end side.

On the other hand, the parts P1 and P2 to be coupled to each other by the HI-LOK fastener F have a common through hole, having a single central axis, for inserting the bolt B. The thicknesses of the parts P1 and P2, and the length of the bolt B are determined so that the external thread of the bolt B inserted into the through hole of the parts P1 and P2 may protrude from the parts P1 and P2.

The distal portion of the bolt B can be inserted into one end portion of the nut N, which is open at both ends, and an internal thread is formed on the inner surface of the nut N. The side surface of the nut N at the other end portion has a shape of a side of a hexagonal column that can be rotated with a wrench. Accordingly, inserting the bolt B into the through hole formed in the parts P1 and P2, and then rotating the other end portion of the nut N with a wrench allow fastening the internal thread of the nut N to the external thread of the bolt B protruding from the parts P1 and P2.

The nut N has an annular constriction that has locally low strength and breaks when specified torque is applied with a wrench, and only the end side portion of the constriction has the side surface shape of the hexagonal column that can be rotated with a wrench. Accordingly, when the internal thread of the nut N is fastened to the external thread of the bolt B and then the torque applied from the wrench to the nut N exceeds a certain value, the nut N breaks at the constriction. Thereby, the coupling of the parts P1 and P2 to each other by the HI-LOK fastener F is completed. That is, the parts P1 and P2 are coupled to each other by the bolt B and the nut N that remains after the breakage. Meanwhile, an end portion of the nut N wrenched off remains on the wrench side as waste.

The external thread may not be formed on the portion of the bolt B that lies inside the through hole formed in the parts P1 and P2 when the bolt B is inserted into the through hole of the parts P1 and P2 so that the portion of the bolt B having no external thread may partially protrude from the parts P1 and P2. In that case, forming no internal thread near the end face of the nut N while forming a hole near the end face of the nut N for inserting a part of the portion of the bolt B having no external thread allows highly accurate positioning between the bolt B and the nut N.

For this reason, the bolt B of the HI-LOK fastener F is sometimes called a pin or a HI-LOK pin. On the other hand, the nut N of the HI-LOK fastener F is sometimes called a collar or a HI-LOK collar since the nut N is annular.

When there is a gap between the bolt B and the through hole of the parts P1 and P2, a hexagonal bar wrench is inserted into the hexagonal hole formed at the tip portion of the bolt B to prevent the bolt B from rotating in order to rotate the nut N. That is, the bolt B is prevented from rotating with a hexagonal bar wrench so that the bolt B may not rotate together with the nut N relative to the parts P1 and P2 when the nut N is rotated.

In contrast, when there is no gap between the bolt B and the through hole of the parts P1 and P2 as in a case where the bolt B is press-fitted into the through hole of the parts P1 and P2, it is not necessary to prevent the bolt B from rotating with a hexagonal bar wrench in order to rotate the nut N. That is, when the bolt B does not rotate relative to the parts P1 and P2 due to the frictional force between the bolt B and the inner surface of the through hole of the parts P1 and P2, it is not necessary to prevent the bolt B from rotating with a hexagonal bar wrench.

When materials of the parts P1 and P2 are each an FRP (fiber reinforced plastic), which is also called a composite material, a gaps is usually formed between the bolt B and the through hole of the parts P1 and P2. On the other hand, when materials of the parts P1 and P2 are each a metal, such as an aluminum alloy, the bolt B is usually driven into the through hole of the parts P1 and P2. This is to improve the fatigue strength of the parts P1 and P2 by generating compressive residual stress around the through hole of the parts P1 and P2.

The fastening tool 1 shown in FIG. 1 is a tool used in a case where it is not necessary to prevent the rotation of the bolt B with a hexagonal bar wrench, i.e., in a case where the bolt B is press-fitted into the through hole of the parts P1 and P2, out of tools for fastening the nut N, which breaks at specified torque, to the bolt B by rotating the nut N as described above. Therefore, the fastening tool 1 shown in FIG. 1 is mainly used when the parts P1 and P2 to be coupled to each other with the HI-LOK fastener F are each made of a metal, such as an aluminum alloy.

The fastening tool 1 may be an attachment to be attached to a rotational drive device 2 that generates rotational power. Alternatively, the fastening tool 1 may include the rotational drive device 2 itself that generates rotational power as a component. The rotational drive device 2 may be a desired device having a rotor and a motor, such as an air motor, a hydraulic motor or an electric motor, for rotating the rotor. As a matter of course, a device obtained by removing a hexagonal bar wrench from a conventional fastening tool for the HI-LOK fastener F may be used as the rotational drive device 2.

Hereinafter, a case where the rotational drive device 2 is an air ratchet 3 will be described as an example. The air ratchet 3 is a tool having an air motor 4 and a rotor 5 rotated by the rotational power of the air motor 4. The air ratchet 3 typically includes a casing 6, a coupler 7 and at least one exhaust port 8 in addition to the air motor 4 and the rotor 5. The casing 6 houses the air motor 4 and the rotor 5 in a state where a part of the rotor 5 is exposed so that an object to be rotated can be attached to and detached from the rotor 5. The coupler 7 is used for coupling a hose for supplying compressed air. The exhaust port 8 or the exhaust ports 8 are for discharging exhaust air.

Regardless of whether the air ratchet 3 is a component of the fastening tool 1 or the fastening tool 1 is an attachment of the air ratchet 3, elements of the fastening tool 1 attached to the air ratchet 3 can include a socket wrench-equipped suction pipe 9, a protection pipe 10, a coupling member 11 and an ejector 12, as exemplified in FIG. 1.

Figure 3:
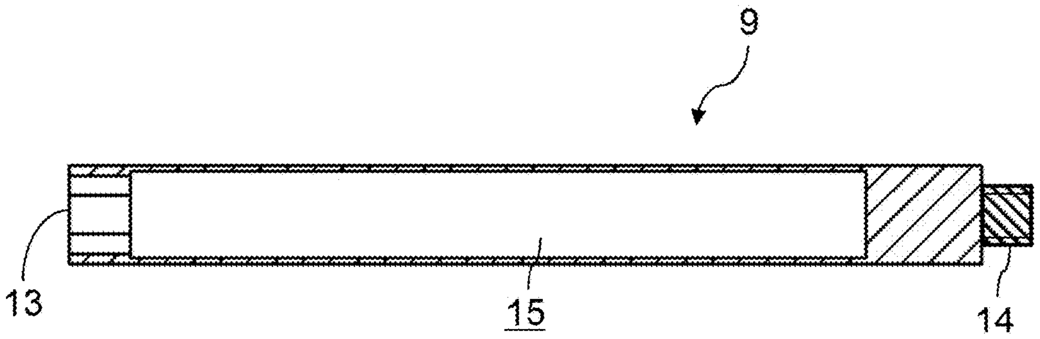
FIG. 3 is a longitudinal sectional view of the socket wrench-equipped suction pipe shown in FIG. 1.
Figure 4:
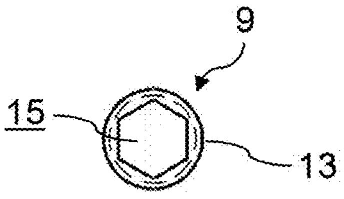
FIG. 4 is a left side view of the socket wrench-equipped suction pipe shown in FIG. 3.
Figure 5:
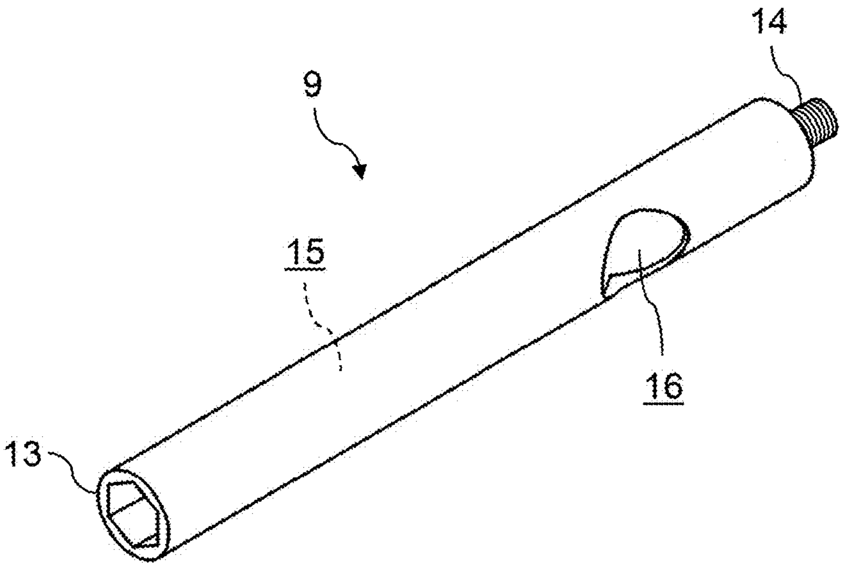
FIG. 5 is a perspective view of the socket wrench-equipped suction pipe shown in FIG. 3.

FIG. 3 is a longitudinal sectional view of the socket wrench-equipped suction pipe 9 shown in FIG. 1. FIG. 4 is a left side view of the socket wrench-equipped suction pipe 9 shown in FIG. 3. FIG. 5 is a perspective view of the socket wrench-equipped suction pipe 9 shown in FIG. 3.

As illustrated, the socket wrench-equipped suction pipe 9 is a pipe having a socket wrench 13 and a detachable structure 14. The socket wrench 13 is formed at one end portion of the socket wrench-equipped suction pipe 9. The socket wrench 13 is used for inserting and rotating the nut N. The socket wrench 13 can be formed as a tubular open end having a hole whose cross section is hexagonal. On the other hand, the detachable structure 14 is formed at the other end portion of the socket wrench-equipped suction pipe 9. The detachable structure 14 can be attached to and detached from the rotor 5 of the air ratchet 3.

The detachable structure 14 is determined according to a detachable structure of the rotor 5 of the air ratchet 3. In the illustrated example, the detachable structure 14 is an external thread since an internal thread is formed in the rotor 5 of the air ratchet 3. As a matter of course, the detachable structure 14 may be a coupler having a desired structure, or may have a simple columnar shape like a straight shank of a cutting tool, depending on a detachable structure of the rotor 5 of the air ratchet 3.

When the detachable structure 14 does not have a tubular structure as in a case where the detachable structure 14 is an external thread, the end of the socket wrench-equipped suction pipe 9 on the air ratchet 3 side is a closed end. The socket wrench-equipped suction pipe 9 is fixed to the rotor 5 of the air ratchet 3 by the detachable structure 14.

Accordingly, the nut N inserted into the socket wrench 13 can be rotated together with the socket wrench-equipped suction pipe 9 by the air ratchet 3.

As described above, when the nut N is rotated, an end portion of the nut N is broken and thereby a piece is generated. Accordingly, a path for collecting a piece of the broken nut N is formed inside the socket wrench-equipped suction pipe 9. More specifically, a suction air flow path 15 having a diameter larger than the maximum diameter of the hole whose cross section is hexagonal, forming the socket wrench 13 is formed inside the socket wrench-equipped suction pipe 9 as the path for collecting a piece of the nut N. Further, the open end of the socket wrench-equipped suction pipe 9 forming the socket wrench 13 is used as an air intake port for taking in suction air.

On the other hand, a suction port 16 for suctioning a broken end of the nut N is opened on the side surface of the socket wrench-equipped suction pipe 9. Accordingly, a piece of the nut N drawn into the suction air flow path 15 can be discharged from the socket wrench-equipped suction pipe 9 via the suction port 16.

In order that suction air taken in from the open end of the socket wrench-equipped suction pipe 9 forming the socket wrench 13 may be discharged from the suction port 16 on the side surface, it is important to prevent air from leaking from an end portion of the socket wrench-equipped suction pipe 9 on the air ratchet 3 side. Accordingly, it is reasonable that a portion of the socket wrench-equipped suction pipe 9 on the air ratchet 3 side of the suction port 16 is not hollow but has a closed end, regardless of a shape of the detachable structure 14. Conversely, it is reasonable that a portion of the socket wrench-equipped suction pipe 9 between the suction port 16 and the socket wrench 13 has a simple cylindrical shape since the socket wrench-equipped suction pipe 9 itself is rotated by the air ratchet 3.

It is realistic to make the socket wrench-equipped suction pipe 9 made of a metal since torque is applied to the nut N made of a metal having high mechanical strength until the nut N breaks. Nevertheless, if the tip of the socket wrench 13 having high mechanical strength comes into contact with the part P2 or a remaining part of the nut N, the part P2 or the remaining part of the nut N may be damaged.

Accordingly, the socket wrench 13 can be covered with the protective pipe 10 as exemplified in FIG. 1. The protection pipe 10 is a resin pipe that rotatably covers the socket wrench-equipped suction pipe 9. The shape of the protection pipe 10 is determined according to an external shape of the socket wrench-equipped suction pipe 9 so that the socket wrench-equipped suction pipe 9 can be inserted into the inside of the protection pipe 10.

Figure 6:
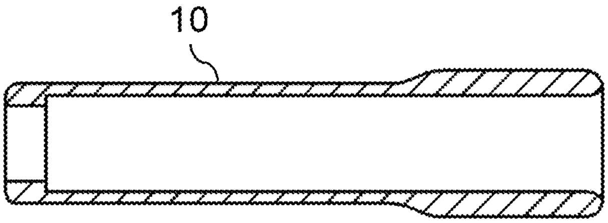
FIG. 6 is a longitudinal sectional view of the protection pipe shown in FIG. 1.
Figure 7:
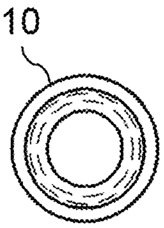
FIG. 7 is a left side view of the protection pipe shown in FIG. 6.
Figure 8:
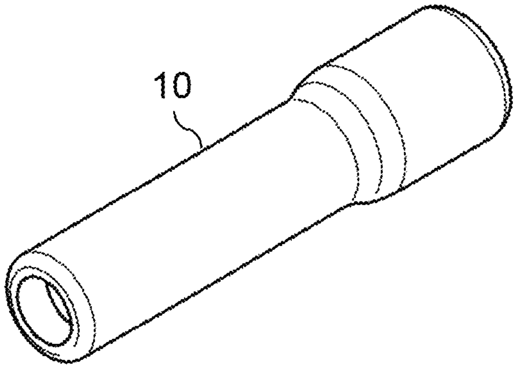
FIG. 8 is a perspective view of the protection pipe shown in FIG. 6.

FIG. 6 is a longitudinal sectional view of the protection pipe 10 shown in FIG. 1. FIG. 7 is a left side view of the protection pipe 10 shown in FIG. 6. FIG. 8 is a perspective view of the protection pipe 10 shown in FIG. 6.

When the outer surface of the socket wrench-equipped suction pipe 9 has a simple cylindrical shape, it is reasonable to make the protective pipe 10 also have a cylindrical shape as illustrated although the protective pipe 10 does not rotate. Both ends of the protection pipe 10 are open ends since the socket wrench-equipped suction pipe 9 having the socket wrench 13 is inserted into the protection pipe 10.

The protection pipe 10 is disposed so that the end face of the protection pipe 10 on the socket wrench 13 side may project beyond the end face of the socket wrench-equipped suction pipe 9 on the socket wrench 13 side by a distance according to a shape of the nut N and a protruding length of the nut N from the part P2. Further, the protection pipe 10 is disposed so that the suction port 16 of the socket wrench-equipped suction pipe 9 may open outside the protection pipe 10.

In other words, the length of the protection pipe 10 is determined so that the suction port 16 of the socket wrench-equipped suction pipe 9 may open outside the protection pipe 10, and the end face of the protection pipe 10 on the socket wrench 13 side may project beyond the end face of the socket wrench-equipped suction pipe 9 on the socket wrench 13 side by a distance according to a shape of the nut N and a protruding length of the nut N from the part P2.

As a result, the tip of the resin protective pipe 10 comes into contact with the part P2 or the nut N instead of the metal socket wrench 13. Specifically, when the nut N has a taper whose outer diameter increases toward the part P2 as exemplified in FIG. 2, the resin protective pipe 10 comes into contact with the tapered portion of the nut N. On the other hand, when the nut N does not have a tapered portion, or when the maximum diameter of the nut N is smaller than the inner diameter of the protective pipe 10 even in a case where the nut N has a tapered portion, the resin protective pipe 10 comes into contact with the surface of the part P2. Accordingly, damage to the nut N or the part P2 caused by the metal socket wrench 13 coming into contact with the tapered portion of the nut N or the surface of the part P2 can be avoided.

Although the inner diameter of the protective pipe 10 is determined according to the maximum diameter of the nut N and the presence or absence of a tapered part, there are multiple types of shapes and maximum diameters of the nut N. Accordingly, the protection pipes 10 having mutually different inner diameters according to shapes and maximum diameters of the nut N can be prepared so as to be exchangeable.

Figure 9:
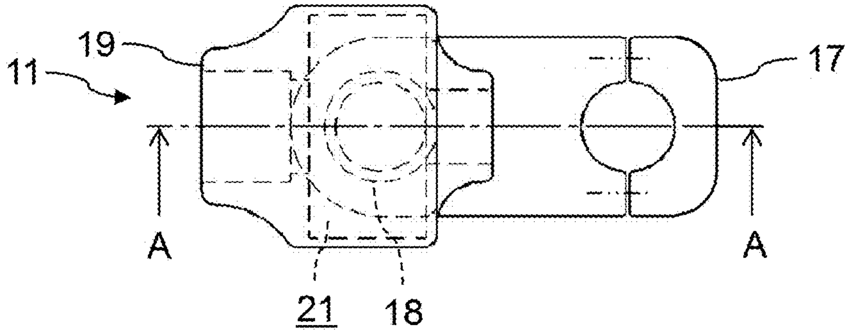
FIG. 9 is a top view of the coupling member shown in FIG. 1.
Figure 10:
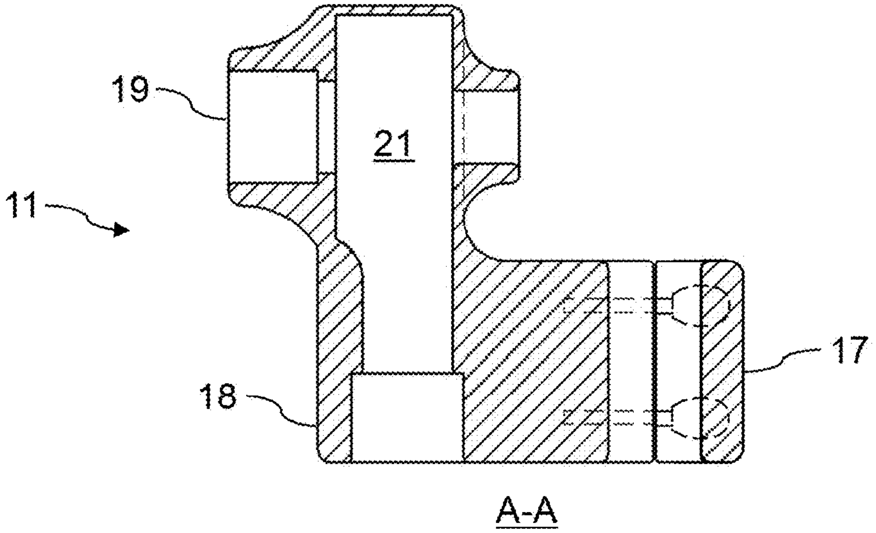
FIG. 10 is a cross-sectional view of the coupling member shown in FIG. 9 at the position A-A.
Figure 11:
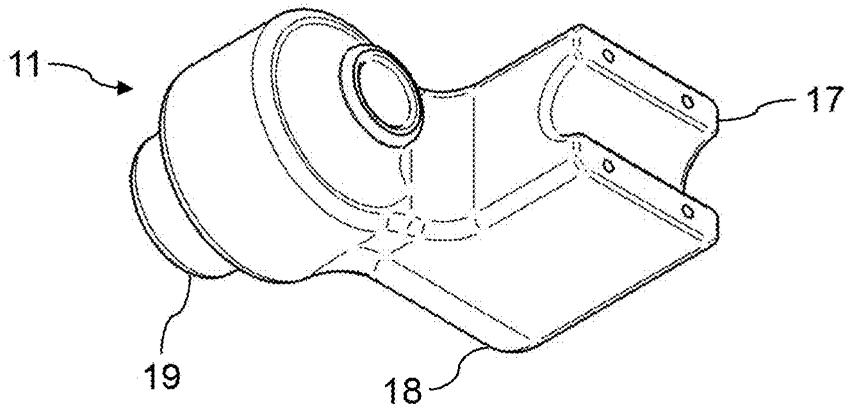
FIG. 11 is a perspective view of the coupling member shown in FIG. 9 with a part removed.

FIG. 9 is a top view of the coupling member 11 shown in FIG. 1. FIG. 10 is a cross-sectional view of the coupling member 11 shown in FIG. 9 at the position A-A. FIG. 11 is a perspective view of the coupling member 11 shown in FIG. 9 with a part removed.

The coupling member 11 is a part for coupling the protection pipe 10 and the ejector 12 to the air ratchet 3 while rotatably holding the socket wrench-equipped suction pipe 9 rotated by the air ratchet 3. The protection pipe 10 and the ejector 12 are fixed to the casing 6 of the air ratchet 3 with the coupling member 11.

The coupling member 11 includes a first coupling portion 17, a second coupling portion 18 and a third coupling part 19. The first coupling portion 17 is for coupling the coupling member 11 to the casing 6 of the air ratchet 3. The second coupling portion 18 is for coupling the ejector 12 to the coupling member 11. The third coupling part 19 is for coupling the protection pipe 10 to the coupling member 11. In the illustrated example, the first coupling portion 17 is a coupling tool that sandwiches the casing 6 of the air ratchet 3 and fixes the casing 6 with screws.

The coupling member 11 has a shape such that the coupling member 11 comes into contact with an annular end face of a portion of the casing 6 that covers the rotor 5 of the air ratchet 3 when the coupling member 11 is coupled to the air ratchet 3 with the first coupling portion 17. Therefore, the socket wrench-equipped suction pipe 9 can be covered with the coupling member 11 so that a portion of the socket wrench-equipped suction pipe 9 on the air ratchet 3 side may not be exposed to the outside. As a matter of course, the first coupling portion 17 may be configured so that the portion of the casing 6 that covers the rotor 5 of the air ratchet 3 can be coupled to the coupling member 11. As a specific example, the first coupling portion 17 may be configured so that the cylindrical portion of the casing 6 that protects the rotor 5 can be inserted into the coupling member 11.

The coupling member 11 may be indirectly fixed to the casing 6 of the air ratchet 3 by coupling the ejector 12 to the casing 6 of the air ratchet 3 and then coupling the ejector 12 to the coupling member 11 with the second coupling portion 18. In that case, the first coupling portion 17 for coupling the coupling member 11 to the casing 6 of the air ratchet 3 is attached to a duct 20 or the like of the ejector 12, and therefore, the coupling member 11 is composed of separate parts. That is, the first coupling portion 17, the second coupling portion 18 and the third coupling part 19 do not necessarily need to be integrated.

The second coupling portion 18 has a structure for coupling a cylindrical end portion of the duct 20 included in the ejector 12. On the other hand, the third coupling part 19 has a structure for coupling the cylindrical end portion of the protection pipe 10. Accordingly, the duct 20 of the ejector 12 and the protection pipe 10 can be each fixed to the coupling member 11.

Each of the coupling member 11 and the duct 20 of the ejector 12 can be made of resin similarly to the protective pipe 10. In that case, the second coupling portion 18 can have a simple structure only for inserting the cylindrical end portion of the duct 20 included in the ejector 12. Similarly, the third coupling part 19 can also have a simple structure only for inserting the cylindrical end portion of the protective pipe 10. Specifically, the second coupling portion 18 and the third coupling part 19 can each be formed of a portion having a wall surface that forms a cylindrical inner surface.

When the coupling member 11 having a complicated shape is made of resin, the coupling member 11 can be easily produced by molding using a three-dimensional (3D) printer. Similarly, when the entire ejector 12 including the duct 20 is made of resin, the ejector 12 can also be easily molded using a 3D printer.

The portion of the socket wrench-equipped suction pipe 9 that protrudes from the protection pipe 10 and has the suction port 16 is covered with the coupling member 11. Accordingly, the socket wrench-equipped suction pipe 9 is rotated by the torque generated by the air ratchet 3 inside the coupling member 11 as well as the protection pipe 10. Therefore, the suction port 16 of the socket wrench-equipped suction pipe 9 for suctioning a cut end of the nut N rotates inside the coupling member 11.

Accordingly, a flow path 21 is formed inside the coupling member 11 to allow the ejector 12 to suction a cut end of the nut N from the suction port 16 of the socket wrench-equipped suction pipe 9 that is rotating. More specifically, the flow path 21 formed inside the coupling member 11 is a void that allows suctioning a piece of the nut N from the suction port 16 of the rotating socket wrench-equipped suction pipe 9 no matter where the suction port 16 is, and then discharging the piece of the nut N suctioned from the suction port 16 into the duct 20 of the ejector 12.

The ejector 12 can include a desired suction device for suctioning a piece of the nut N with compressed air. The ejector 12 can be composed of an air supply system 22 and a collection part 23 as well as the duct 20. One end portion of the duct 20 is coupled to the coupling member 11, and a flow path is formed inside the duct 20. The collection part 23 can be directly or indirectly coupled to the other end portion of the duct 20 detachably. The air supply system 22 supplies suction air. The air supply system 22 can be coupled to the duct 20 at a desired position.

The collection part 23 is a bag or a container for collecting pieces of the nuts N each sucked with air. The collection part 23 may be a bag or a container, having a desired shape and structure, through which air can pass, like a cloth bag, a mesh bag or a box having an air outlet.

The air supply system 22 is a device configured to supply air into the duct 20 to suck a piece of the nut N. The air supply system 22 may not be coupled to the side surface of the duct 20, but may be coupled to the rear of the collection part 23 via another duct.

When the rotational drive device 2 is the air ratchet 3, the rotational drive device 2 is configured to rotate the rotor 5 with the air motor 4. Therefore, air for rotating the air motor 4 is exhausted from the air ratchet 3. Accordingly, the ejector 12 can be configured to suck a piece of the nut N using exhaust air from the air ratchet 3.

In that case, a flow path 24 can be formed by a coupling pipe 25 so that air exhausted from the air ratchet 3 can be taken into the duct 20 as air for sucking a piece of the nut N, as illustrated. Thereby, the air supply system 22 can be easily composed of the coupling pipe 25.

Figure 12:
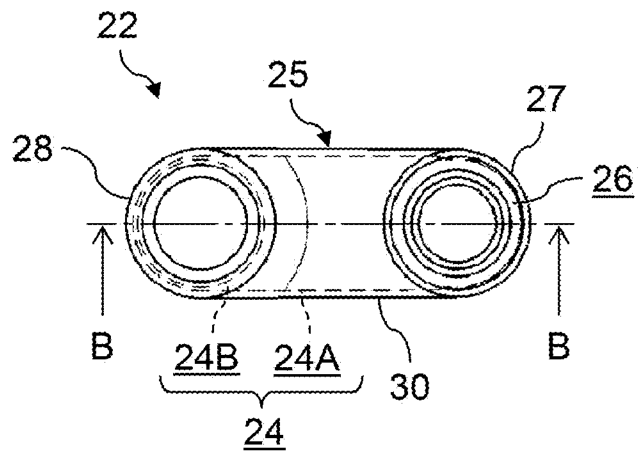
FIG. 12 is a top view showing a structural example of the coupling pipe provided as the air supply system in the ejector shown in FIG. 1.
Figure 13:
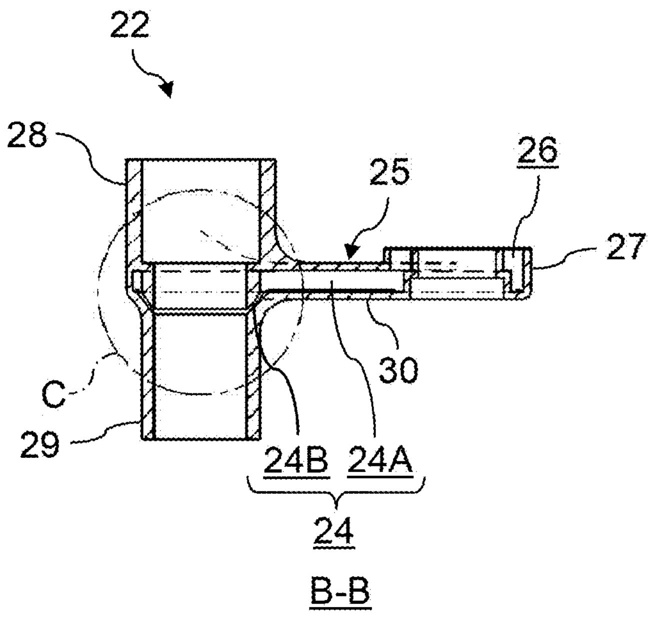
FIG. 13 is a cross-sectional view of the coupling pipe shown in FIG. 12 at the position B-B.
Figure 14:
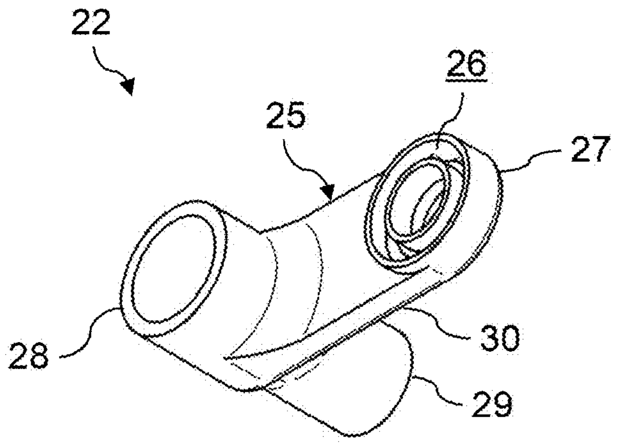
FIG. 14 is a perspective view of the coupling pipe shown in FIG. 12.
Figure 15:
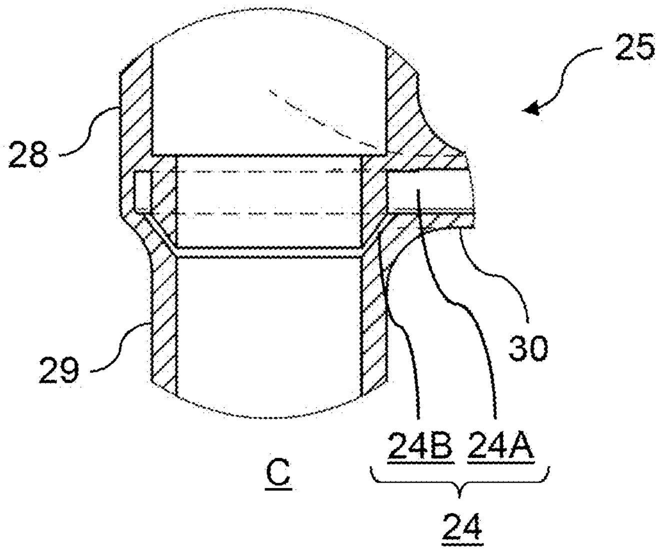
FIG. 15 is an enlarged view of the coupling pipe shown in FIG. 13 at the position C.

FIG. 12 is a top view showing a structural example of the coupling pipe 25 provided as the air supply system 22 in the ejector 12 shown in FIG. 1. FIG. 13 is a cross-sectional view of the coupling pipe 25 shown in FIG. 12 at the position B-B. FIG. 14 is a perspective view of the coupling pipe 25 shown in FIG. 12. FIG. 15 is an enlarged view of the coupling pipe 25 shown in FIG. 13 at the position C.

For example, the coupling pipe 25 has an air intake portion 27, a fourth coupling portion 28, a fifth coupling portion 29 and a conduit 30. The air intake portion 27 has an intake port 26 for taking in air discharged from the casing 6 of the air ratchet 3. The fourth coupling portion 28 is detachably coupled to the end portion of the duct 20 directly coupled to the coupling member 11. The fifth coupling portion 29 is used for attaching the collection part 23. The conduit 30 couples the air intake portion 27 to the fourth coupling portion 28 and the fifth coupling portion 29.

The fourth coupling portion 28 and the fifth coupling portion 29 form a part of the entire duct 20 by being coupled to the end portion of the duct 20 directly coupled to the coupling member 11. When the end portion of the duct 20 directly coupled to the coupling member 11 has a simple cylindrical shape, the fourth coupling portion 28 formed in the coupling pipe 25 can also have a simple structure having a cylindrical inner surface, formed by a wall surface, for inserting the cylindrical end portion of the duct 20, similarly to the second coupling portion 18 formed in the coupling member 11.

On the other hand, the fifth coupling portion 29 can have a structure corresponding to a shape and structure of the collection part 23. In the illustrated example, the fifth coupling portion 29 has a simple cylindrical structure.

It is appropriate that a shape of the intake port 26 formed in the air intake portion 27 of the coupling pipe 25 is determined in accordance with a shape of at least one air exhaust port formed in the casing 6 of the air ratchet 3. In many cases, the casing 6 of the air ratchet 3 has air exhaust ports formed of arc-like slits surrounding the coupler 7 for taking in air for rotation of the air motor 4. Accordingly, in the illustrated example, the intake port 26 is annular, and a through hole is formed in the air intake portion 27 so as not to interfere with the coupler 7 attached to the casing 6 of the air ratchet 3.

A part of the flow path 24 for taking air exhausted from the air ratchet 3 into the duct 20 is formed inside the conduit 30 coupled to the air intake portion 27. The inlet of a flow path 24A formed inside the conduit 30 is coupled to the annular intake port 26 formed in the air intake portion 27. On the other hand, the outlet of the flow path 24A formed inside the conduit 30 is coupled to the inside of the duct 20.

The flow of air flowing into the duct 20 from the flow path 24A in the conduit 30 needs to be formed in a direction in which a cut end of the nut N is suctioned. That is, air is flown into the duct 20 from the flow path 24A in the conduit 30 so that an air flow may be formed downstream inside the duct 20.

Accordingly, it is appropriate that the flow path 24A in the conduit 30 is coupled to the flow path formed in the duct 20 with a flow path 24B that is slanted to the length direction of the flow path formed in the duct 20, as illustrated. In the illustrated example, the flow path 24A in the conduit 30 is coupled to the flow path formed in the duct 20 with the flow path 24B formed of an annular inclined slit formed between two wall surfaces, each having a truncated conical side surface shape, so as to surround the flow path in the duct 20.

Therefore, a uniform air flow in the downstream direction can be formed in the duct 20 to suck a cut end of the nut N. That is, an appropriate air flow toward the collection part 23 and the outlet of the duct 20 can be formed.

Figure 16:
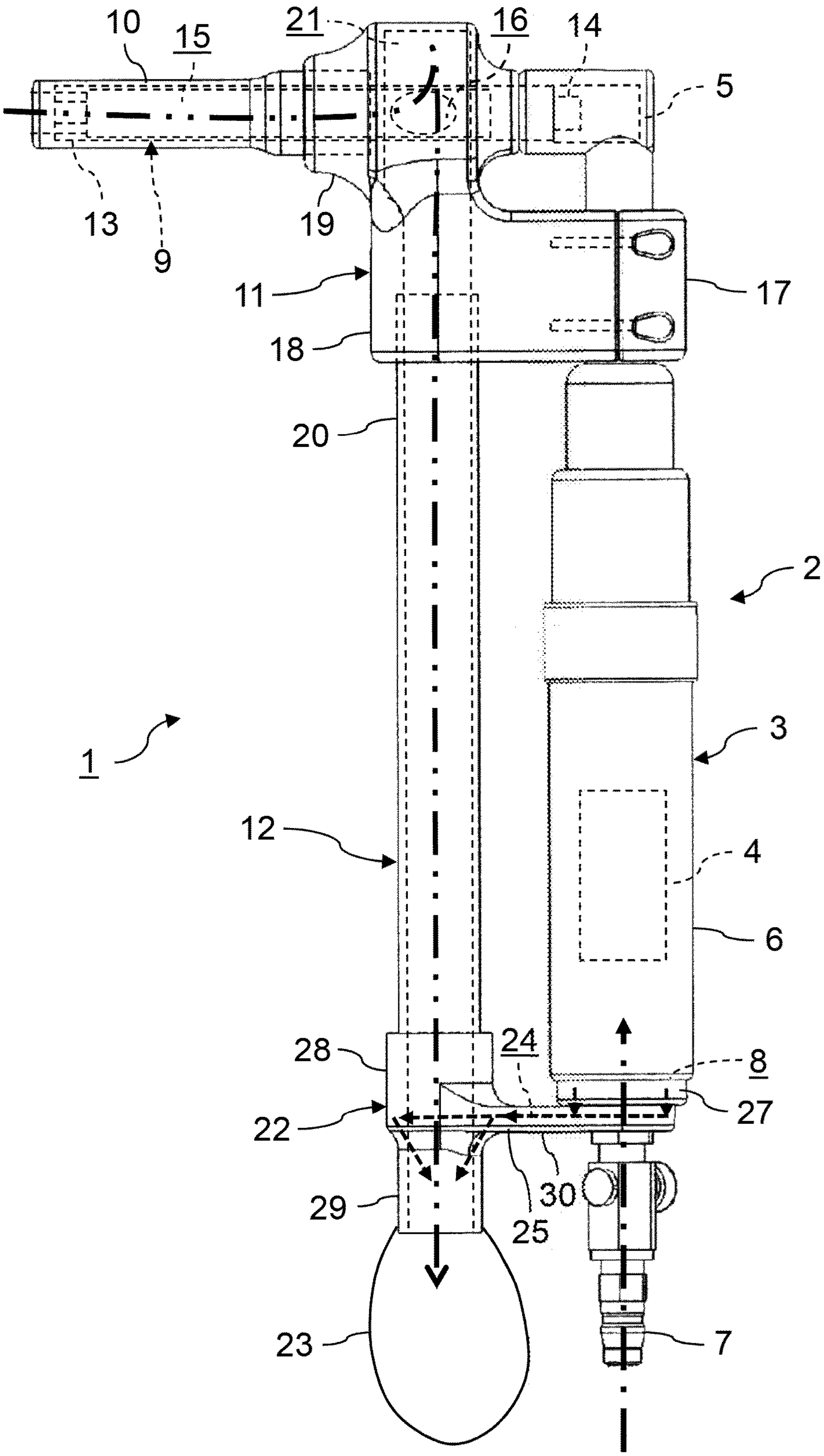
FIG. 16 shows a flow of air in the fastening tool shown in FIG. 1.

FIG. 16 shows a flow of air in the fastening tool 1 shown in FIG. 1.

Air supplied to the air motor 4 from a hose for supplying compressed air through the coupler 7 of the air ratchet 3 as shown by the dashed line in FIG. 16 is exhausted from the at least one exhaust port 8 formed in the casing 6. The air exhausted from the at least one exhaust port 8 formed in the casing 6 of the air ratchet 3 flows into the intake port 26 formed in the air intake portion 27 of the coupling pipe 25 as shown by the dotted lines in FIG. 16. The air that has flowed into the intake port 26 of the air intake portion 27 flows into the inside of the duct 20 through the flow path 24A and the flow path 24B inside the conduit 30.

The flow path 24B is slanted so that the air flowing in the flow path 24B may flow downstream inside the duct 20. Therefore, the air flows from the outlet of the flow path 24B opened in the duct 20 toward the collection part 23 and the outlet of the duct 20.

Thereby, the pressure in the duct 20 on the upstream side of the outlet of the flow path 24B becomes negative pressure. As a result, air flows into the open end of the socket wrench-equipped suction pipe 9 having the socket wrench 13 as shown by the two-dot chain line in FIG. 16. The air that has flowed into the socket wrench-equipped suction pipe 9 flows into the flow path 21 formed inside the coupling member 11 through the flow path 15 formed inside the socket wrench-equipped suction pipe 9 and the suction port 16 of the socket wrench-equipped suction pipe 9. The air that has flowed into the flow path 21 formed inside the coupling member 11 flows into the duct 20 of the ejector 12. The air that has flowed into the duct 20 of the ejector 12 is discharged from the outlet of the duct 20 toward the collection part 23.

The above-mentioned air flow allows suctioning a piece of the nut N remaining inside the socket wrench 13 and then collecting the piece of the nut N in the collection part 23. That is, a piece of the nut N can be suctioned into the duct 20 and then collected in the collection part 23 by the ejector 12 utilizing exhaust air from the air ratchet 3 although the air ratchet 3 itself does not have a suction function.

As described above, the fastening tool 1 is configured to fasten the HI-LOK fastener F with the socket wrench 13 rotated by the air ratchet 3 while suctioning a piece of the nut N to the collection part 23 by negative pressure generated by the ejector 12. Fastening the nut N of the HI-LOK fastener F to the bolt B and then breaking the nut N using the fastening tool 1 allows producing a fastened product including the parts P1 and P2 coupled to each other with the bolt B and a portion of the broken nut N having the internal thread fastened to the external thread of the bolt B.

Effects

According to the above-mentioned fastening tool 1 and method of producing a fastened product, it is possible to eliminate the need for an operator to remove a piece of the broken nut N from the socket wrench 13 in case of coupling the parts P1 and P2 to each other using a fastener, such as the HI-LOK fastener F, whose nut N breaks when specified torque is applied, which is mainly used for assembling aircraft parts. In addition, even when a piece of the nut N remains inside the socket wrench 13, the next fastening operation can be continued. Accordingly, productivity can be improved in assembly work of the parts P1 and P2.

HI-LOK (registered trademark) fasteners are known as one of fasteners mainly used to couple aircraft parts to each other. The HI-LOK fastener is a fastener that breaks under specified torque. The HI-LOK fastener is used by inserting a bolt into a through hole formed in a component to protrude the tip portion having an external thread, and then tightening a nut onto the external thread formed on the bolt using a wrench. When the torque applied from the wrench to the nut reaches a specified value, the nut breaks.

A hexagonal hole is formed at the tip portion of a bolt constituting the HI-LOK fastener, and when there is a gap between the bolt and a part, a nut is tightened with an open wrench while inserting a hexagonal bar wrench into the hexagonal hole at the tip portion of the bolt to prevent the bolt from rotating. On the other hand, when a bolt is press-fitted into a part, a nut can be tightened with an open wrench without using a hexagonal bar wrench.

A special fastening tool for fastening the HI-LOK fasteners is also known (for example, refer to U.S. Pat. Nos. 4,538,483, 5,305,666, Japanese Patent Application Publication JP H06-155319A and Japanese Patent Application Publication JP2011-230244A). The fastening tool for the HI-LOK fasteners has both a hexagonal bar wrench for inserting into a hexagonal hole at the tip portion of a bolt, and a socket wrench for rotating a nut. Therefore, a nut can be fastened by the socket wrench until the nut breaks while inserting the hexagonal bar wrench into a hexagonal hole at the tip portion of a bolt to prevent the bolt from rotating.

However, when the HI-LOK fastener is fastened with the conventional fastening tool, a broken piece of a nut remains in the socket wrench. Accordingly, it takes time and effort for removing the piece of nut from the socket wrench.

According to an embodiment of the present invention, the need to remove a nut scrap from a wrench is eliminated in case of coupling parts to each other using fasteners, such as HI-LOK fasteners, whose nuts each breaks under specified torque.

According to one embodiment of the present invention, a fastening tool for fastening a nut to a bolt by rotating the nut includes a pipe and a coupling member. The nut breaks at specified torque. The pipe has a socket wrench, a detachable structure and a suction port. The socket wrench is formed at one end portion of the pipe. The socket wrench is for inserting and rotating the nut. The detachable structure is formed at the other end portion of the pipe. The detachable structure is for attaching to and detaching from a rotor of a rotational drive device. The suction port opens on a side of the pipe. The suction port is for suctioning a piece of the nut broken by the specified torque. The coupling member has a flow path, a first coupling portion and a second coupling portion. The flow path is for suctioning the piece of the nut from the suction port of the pipe rotating with torque generated by the rotational drive device. The piece of the nut is suctioned from the suction port with an ejector. The first coupling portion is for coupling the coupling member to a casing of the rotational drive device. The second coupling portion is for coupling the coupling member to a duct of the ejector.

Further, according to one embodiment of the present invention, a method of producing a fastened product includes: inserting the above-mentioned bolt into a through hole formed in parts; and producing the fastened product by fastening the above-mentioned nut to the bolt and breaking the nut using the above-mentioned fastening tool. The fastened product has the bolt, a broken portion of the nut and the parts. The broken portion of the nut has an internal thread. The broken portion of the nut is fastened to an external thread of the bolt. The parts are coupled to each other with the bolt and the broken portion of the nut.

Obviously, numerous modifications and variations of the present invention are possible in light of the above teachings. It is therefore to be understood that within the scope of the appended claims, the invention May be practiced otherwise than as specifically described herein.

What is claimed is:

1. A fastening tool for fastening a nut to a bolt by rotating the nut, comprising:

a pipe having a socket wrench formed at one end portion of the pipe, a detachable structure formed at an other end portion of the pipe, and a suction port comprising a through hole penetrating through a curved wall of the pipe between the one end portion and the other end portion; and a coupler having a flow path, a first coupling portion that couples the coupler to a casing of a rotational drive device, and a second coupling portion that couples the coupler to a duct of an ejector such that the suction port of the pipe is positioned to be connected to the flow path of the coupler, wherein the socket wrench is configured to insert and rotate a nut, the detachable structure has at least one of a thread, a detachable coupler and a column and configured to attach to and detach from a rotor of the rotational drive device having the rotor, a motor configured to rotate the rotor, and the casing housing the rotor and the motor such that the rotor is configured to rotate the pipe, and the flow path is configured to suction a piece of the nut broken by a specified torque from the suction port of the pipe closed at the other end and rotating with torque generated by the rotational drive device while changing the direction of a central axis of the suction port.

2. The fastening tool according to claim 1, further comprising:

a protection pipe comprising a resin and fixed to the coupler, wherein the pipe is made of a metal, the protection pipe rotatably covers the pipe having the socket wrench in a state where an end surface of the protection pipe protrudes beyond an end surface of the one end portion of the pipe having the socket wrench by a distance according to a shape of the nut and a protrusion length of the nut from parts coupled to each other by the bolt and the nut.

3. The fastening tool according to claim 2, further comprising:

the ejector that suctions the piece of the nut from the suction port, wherein the motor is an air motor, and the ejector has the duct coupled to the coupler, and a coupling pipe forming a second flow path configured to take air discharged from the rotational drive device to rotate the motor into the duct as air for suctioning the piece of the nut.

4. The fastening tool according to claim 3, further comprising:

the rotational drive device.

5. A method of producing a fastened product, comprising:

inserting a bolt into a through hole formed in parts; and producing a fastened product by fastening a nut to the bolt and breaking the nut using the fastening tool of claim 4, wherein the fastened product having the bolt, a broken portion of the nut having an internal thread and fastened to an external thread of the bolt, and the parts coupled to each other with the bolt and the broken portion of the nut.

6. A method of producing a fastened product, comprising:

inserting a bolt into a through hole formed in parts; and producing a fastened product by fastening a nut to the bolt and breaking the nut using the fastening tool of claim 3, wherein the fastened product having the bolt, a broken portion of the nut having an internal thread and fastened to an external thread of the bolt, and the parts coupled to each other with the bolt and the broken portion of the nut.

7. The fastening tool according to claim 2, further comprising:

the rotational drive device.

8. A method of producing a fastened product, comprising:

inserting a bolt into a through hole formed in parts; and producing a fastened product by fastening a nut to the bolt and breaking the nut using the fastening tool of claim 7, wherein the fastened product having the bolt, a broken portion of the nut having an internal thread and fastened to an external thread of the bolt, and the parts coupled to each other with the bolt and the broken portion of the nut.

9. A method of producing a fastened product, comprising:

inserting a bolt into a through hole formed in parts; and producing a fastened product by fastening a nut to the bolt and breaking the nut using the fastening tool of claim 2, wherein the fastened product having the bolt, a broken portion of the nut having an internal thread and fastened to an external thread of the bolt, and the parts coupled to each other with the bolt and the broken portion of the nut.

10. The fastening tool according to claim 1, further comprising:

the ejector that suctions the piece of the nut from the suction port, wherein the motor is an air motor, and the ejector has the duct coupled to the coupler, and a coupling pipe forming a second flow path configured to take air discharged from the rotational drive device to rotate the motor into the duct as air for suctioning the piece of the nut.

11. The fastening tool according to claim 10, further comprising:

the rotational drive device.

12. A method of producing a fastened product, comprising:

inserting a bolt into a through hole formed in parts; and producing a fastened product by fastening a nut to the bolt and breaking the nut using the fastening tool of claim 11, wherein the fastened product having the bolt, a broken portion of the nut having an internal thread and fastened to an external thread of the bolt, and the parts coupled to each other with the bolt and the broken portion of the nut.

13. A method of producing a fastened product, comprising:

inserting a bolt into a through hole formed in parts; and producing a fastened product by fastening a nut to the bolt and breaking the nut using the fastening tool of claim 10, wherein the fastened product having the bolt, a broken portion of the nut having an internal thread and fastened to an external thread of the bolt, and the parts coupled to each other with the bolt and the broken portion of the nut.

14. The fastening tool according to claim 10, wherein the coupling pipe has the second flow path including an annular inclined slit formed between two wall surfaces of the coupling pipe such that each of the wall surfaces has a truncated conical side surface and surrounds a third flow path formed in the duct.

15. The fastening tool according to claim 1, further comprising:

the rotational drive device.

16. A method of producing a fastened product, comprising:

inserting a bolt into a through hole formed in parts; and producing a fastened product by fastening a nut to the bolt and breaking the nut using the fastening tool of claim 15, wherein the fastened product having the bolt, a broken portion of the nut having an internal thread and fastened to an external thread of the bolt, and the parts coupled to each other with the bolt and the broken portion of the nut.

17. A method of producing a fastened product, comprising:

inserting a bolt into a through hole formed in parts; and producing a fastened product by fastening a nut to the bolt and breaking the nut using the fastening tool of claim 1, wherein the fastened product having the bolt, a broken portion of the nut having an internal thread and fastened to an external thread of the bolt, and the parts coupled to each other with the bolt and the broken portion of the nut.

18. The fastening tool according to claim 1, wherein the coupler is configured to rotatably hold the pipe rotated by the rotational drive device.

19. The fastening tool according to claim 1, wherein the coupler includes a third coupling portion that couples the coupler to the pipe such that the third coupling portion rotatably holds the pipe rotated by the rotational drive device.

20. A fastening tool for fastening a nut to a bolt by rotating the nut, comprising:

a pipe having a socket wrench formed at one end portion of the pipe, a detachable structure formed at an other end portion of the pipe, and a suction port formed on a side portion of the pipe between the one end portion and the other end portion; and a coupler having a flow path, a first coupling portion that couples the coupler to a casing of a rotational drive device, and a second coupling portion that couples the coupler to a duct of an ejector such that the suction port of the pipe is positioned to be connected to the flow path of the coupler, wherein the socket wrench is configured to insert and rotate a nut, the detachable structure has at least one of a thread, a detachable coupler and a column and configured to attach to and detach from a rotor of the rotational drive device having the rotor, a motor configured to rotate the rotor, and the casing housing the rotor and the motor such that the rotor is configured to rotate the pipe, the flow path is configured to suction a piece of the nut broken by a specified torque from the suction port of the pipe rotating with torque generated by the rotational drive device, the detachable structure comprises an external thread configured to be attached to and detached from an internal thread formed in the rotor of the rotational drive device, and the coupler includes a third coupling portion that couples the coupler to the pipe such that the third coupling portion rotatably holds the pipe rotated by the rotational drive device.

* * * * *